US010686351B2

(12) United States Patent
Okuyama et al.

(10) Patent No.: US 10,686,351 B2
(45) Date of Patent: Jun. 16, 2020

(54) ROTOR MANUFACTURING METHOD AND ROTOR

(71) Applicant: DAIKIN INDUSTRIES, LTD., Osaka-shi, Osaka (JP)

(72) Inventors: Yoshitaka Okuyama, Osaka (JP); Yoshiki Yasuda, Osaka (JP); Yoshinari Asano, Osaka (JP)

(73) Assignee: DAIKIN INDUSTRIES, LTD., Osaka-shi (JP)

( * ) Notice: Subject to any disclaimer, the term of this patent is extended or adjusted under 35 U.S.C. 154(b) by 220 days.

(21) Appl. No.: 15/745,958

(22) PCT Filed: Jun. 3, 2016

(86) PCT No.: PCT/JP2016/002705
§ 371 (c)(1),
(2) Date: Jan. 18, 2018

(87) PCT Pub. No.: WO2017/017878
PCT Pub. Date: Feb. 2, 2017

(65) Prior Publication Data
US 2018/0212497 A1    Jul. 26, 2018

(30) Foreign Application Priority Data
Jul. 27, 2015 (JP) .................. 2015-147960

(51) Int. Cl.
*H02K 15/03* (2006.01)
*H02K 1/27* (2006.01)
(Continued)

(52) U.S. Cl.
CPC ......... *H02K 15/03* (2013.01); *B29C 45/0013* (2013.01); *B29C 45/14344* (2013.01);
(Continued)

(58) Field of Classification Search
CPC ........ H02K 15/03; H02K 15/12; H02K 1/276; H02K 1/2766
(Continued)

(56) References Cited

U.S. PATENT DOCUMENTS 9,780,610 B2 * 10/2017 Yamada ................ H02K 1/243
2002/0047409 A1 * 4/2002 Hiroyuki ................ H02K 15/03
310/100

(Continued)

FOREIGN PATENT DOCUMENTS

JP        9-168247 A      6/1997
JP     2000-141428 A      5/2000
(Continued)

OTHER PUBLICATIONS

International Search Report for PCT/JP2016/002705 (PCT/ISA/210) dated Aug. 23, 2016.

*Primary Examiner* — Hanh N Nguyen
(74) *Attorney, Agent, or Firm* — Birch, Stewart, Kolasch & Birch, LLP

(57) ABSTRACT

Disclosed herein is a method for manufacturing a rotor, the method including an injection process of injecting a bonded magnet material into a cavity of a molding die generating a magnetic field in the cavity so that the bonded magnet material is poured into each of the magnet slots in the rotor core set in the cavity through one of openings of each magnet slot, wherein the molding die used in the injection process has gates which respectively open at positions corresponding to regions, each of which ensures a view from the one of openings to the other opening of the magnet slot along an axial center of the rotor core.

7 Claims, 16 Drawing Sheets

(51) Int. Cl.
  *B29C 45/00* (2006.01)
  *B29C 45/14* (2006.01)
  *B29C 45/27* (2006.01)
  *B29C 45/58* (2006.01)
  *H02K 29/03* (2006.01)
  *B29K 81/00* (2006.01)
  *B29K 103/06* (2006.01)
  *B29L 31/34* (2006.01)
  *H02K 1/02* (2006.01)
  *H02K 15/12* (2006.01)

(52) U.S. Cl.
  CPC ........ *B29C 45/2708* (2013.01); *B29C 45/581* (2013.01); *H02K 1/27* (2013.01); *H02K 1/2766* (2013.01); *B29K 2081/04* (2013.01); *B29K 2103/06* (2013.01); *B29K 2995/0008* (2013.01); *B29L 2031/34* (2013.01); *H02K 1/02* (2013.01); *H02K 1/2773* (2013.01); *H02K 15/12* (2013.01); *H02K 29/03* (2013.01); *H02K 2201/06* (2013.01); *H02K 2213/03* (2013.01)

(58) Field of Classification Search
  USPC .......................... 29/596; 310/156.01–156.84
  See application file for complete search history.

(56) References Cited

U.S. PATENT DOCUMENTS

| | | | | |
|---|---|---|---|---|
| 2007/0018521 | A1* | 1/2007 | Ishiguro | F04D 29/043 |
| | | | | 310/156.43 |
| 2011/0304235 | A1* | 12/2011 | Hashiba | H02K 1/02 |
| | | | | 310/156.76 |
| 2016/0126792 | A1* | 5/2016 | Yamaguchi | H02K 1/2766 |
| | | | | 310/43 |

FOREIGN PATENT DOCUMENTS

| | | |
|---|---|---|
| JP | 2002-44915 A | 2/2002 |
| JP | 3619885 B2 | 2/2005 |
| JP | 2014-57433 A | 3/2014 |
| JP | 2015-61430 A | 3/2015 |

\* cited by examiner

ROTOR MANUFACTURING METHOD AND ROTOR

TECHNICAL FIELD

The present invention relates to a method for manufacturing a rotor of an electric rotating machine, and a rotor.

BACKGROUND ART

Some electric rotating machines such as motors and power generators include a rotor having so-called "bonded magnets" obtained by mixing a magnetic material in the shape of fine powder or particles with a resin (binder), and solidifying the mixture. One of such electric rotating machines employs, as a rotor core, a laminated core made of a laminate of core members, each of which is formed by punching a magnetic steel sheet. The laminated core is skewed to reduce cogging torque (see, e.g., Patent Document 1).

CITATION LIST

Patent Document

[Patent Document 1] Japanese Patent No. 3619885

SUMMARY OF THE INVENTION

Technical Problem

If a bonded magnet material is injected into the skewed laminated core, unwanted stress is exerted on the core members, which may break the core members. Specifically, in the skewed laminated core, a lamination plane of the core members (formed by punching a magnetic steel sheet) is partially exposed in magnet slots. Thus, the bonded magnet material, when injected into the magnet slots by an injection molding machine, may possibly apply unwanted pressure to the exposed lamination plane.

In view of the foregoing background, it is therefore an object of the present invention to reduce stress exerted on core members during the formation of bonded magnets.

Solution To The Problem

In order to achieve the object, a first aspect of the present invention is directed to a method for manufacturing a rotor including a skewed rotor core (21) made of a cylindrical laminate of a plurality of disc-shaped core members (22) each having through holes (25) respectively corresponding to magnet slots (24) for housing bonded magnets (26), the core members (22) being shifted in a circumferential direction in accordance with their position in the laminate. The method includes an injection process of injecting a bonded magnet material (26a) into a cavity (43) of a molding die (40) generating a magnetic field in the cavity (43) so that the bonded magnet material (26a) is poured into each of the magnet slots (24) in the rotor core (21) set in the cavity (43) through one of openings (24a) of each magnet slot (24), wherein the molding die (40) used in the injection process has gates (48) which respectively open at positions corresponding to regions (A), each of which ensures a view from the one of openings (24a) to the other opening (24b) of the magnet slot (24) along an axial center (O) of the rotor core (21).

In this configuration, the rotor core (21) is skewed, and a lamination plane (S) of the core members (22) is partially exposed (an exposed surface (E) is formed). Even in this state, use of the molding die (40) having the gates (48) respectively corresponding to the regions (A) may reduce the possibility that the bonded magnet material (26a) just injected into the molding die (40) hits the exposed surface (E).

A second aspect is an embodiment of the first aspect. In the second aspect, each of the gates (48) of the molding die (40) used in the injection process opens in alignment with a center (Ca) of an associated one of the regions (A).

In this configuration, the area of the exposed surface (E) facing the gate (48) can be reduced with reliability. This can further reduce the possibility that the bonded magnet material (26a) just injected into the molding die hits the exposed surface (E).

A third aspect is an embodiment of the first aspect. In the third aspect, each of the gates (48) of the molding die (40) used in the injection process opens at a position misaligned with a center (Ca) of an associated one of the regions (A) in a direction toward a center (Cs) of the opening (24a) of the magnet slot (24) through which the bonded magnet material (26a) is injected.

In this configuration, the bonded magnet material (26a) injected from the gate (48) easily spreads uniformly in a direction orthogonal to the direction of injection.

A fourth aspect is an embodiment of any one of the first to third aspects. In the fourth aspect, the bonded magnet material (26a) contains polyphenylene sulfide as a binder for a magnetic material.

A fifth aspect is directed to a rotor including bonded magnets (26), the rotor comprising: a skewed rotor core (21) made of a cylindrical laminate of a plurality of disc-shaped core members (22) each having through holes (25) respectively corresponding to magnet slots (24) for housing the bonded magnets (26), the core members (22) being shifted in a circumferential direction in accordance with their position in the laminate, wherein each of the bonded magnets (26) has a gate mark (27) which is left on a portion of an end face of the bonded magnet (26), the portion corresponding to a region (A) which ensures a view from one of openings (24a) of the magnet slot (24) formed at the end face to the other opening (24b) along an axial center (O) of the rotor core (21).

Advantages Of The Invention

According to the first aspect, stress exerted on the core members (22) during the formation of the bonded magnets (26) can be reduced.

According to the second aspect, the stress exerted on the core members (22) during the formation of the bonded magnets (26) can be reduced more effectively.

According to the third aspect, the bonded magnet material easily spreads uniformly in the direction orthogonal to the direction of injection. Thus, improvement in the ratio of magnetic orientation can be expected.

DETAILED DESCRIPTION

Embodiments of the present invention will be described in detail below with reference to the drawings. The following embodiments are merely exemplary ones in nature, and are not intended to limit the scope, application, or uses of the invention.

First Embodiment

Figure 1:
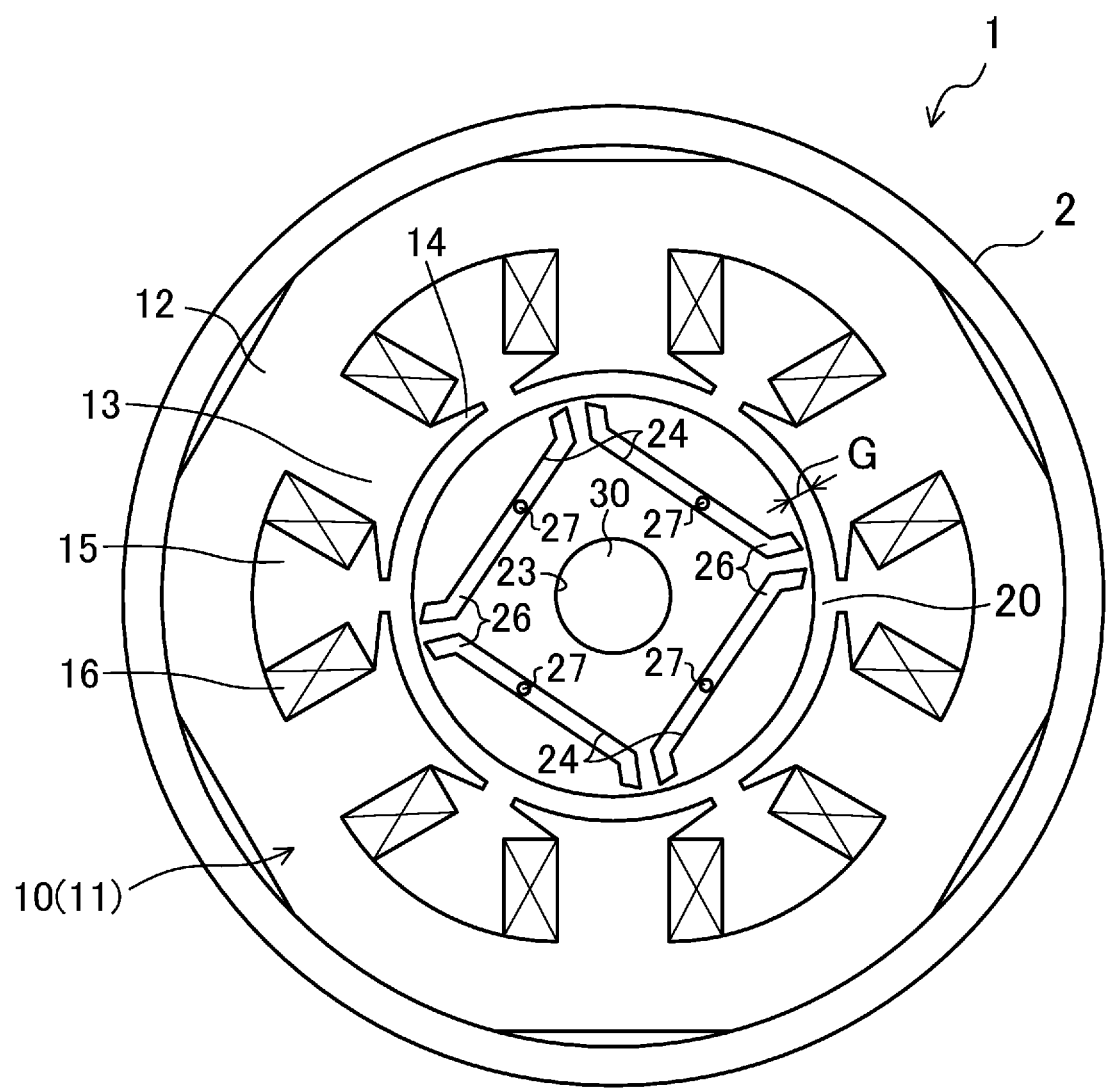
FIG. 1 illustrates a motor as an example of an electric rotating machine to which a method for manufacturing a rotor according to a first embodiment of the present invention is applied.

FIG. 1 illustrates a motor (1) as an example of an electric rotating machine to which a method for manufacturing a rotor according to the first embodiment of the present invention is applied. The motor (1) is an interior permanent magnet motor, and includes, as shown in FIG. 1, a stator (10), a rotor (20), a drive shaft (30), and a casing (2). In the following description, an "axial direction" is a direction of an axial center of the drive shaft (30), and a "radial direction" is a direction orthogonal to the axial direction. An "outer peripheral" portion of a component is a portion far from the axial center, and an "inner peripheral" portion is a portion closer to the axial center.

<Stator (10)>

The stator (10) includes a cylindrical stator core (11) and a coil (16).

The stator core (11) is a so-called "laminated core," and is formed by laminating, in the axial direction, a plurality of plate members formed by punching a magnetic steel sheet with a pressing machine. The stator core (11) includes a back yoke (12), a plurality of (six in this embodiment) teeth (13), and a plurality of flanges (14). The stator core (11) is fitted and fixed in the casing (2) such that an outer peripheral surface of the back yoke (12) partially comes into contact with an inner peripheral surface of the casing (2).

The back yoke (12) is an outer peripheral portion of the stator core (11), and is annular when viewed in plan.

Each of the teeth (13) is a radially extending, rectangular parallelepiped-shaped portion of the stator core (11). A coil (16) is wound around each of the teeth (13) by, for example, concentrated winding. A space between an adjacent pair of teeth (13) serves as a coil slot (15) for housing the coil (16). Thus, each of the teeth (13) serves as an electromagnet.

Each of the flanges (14) is a portion continuously extending in both circumferential directions from an inner peripheral end portion of an associated one of the teeth (13). Thus, the flange (14) has a larger width (length in the circumferential direction) than the teeth (13). The flange (14) has an inner peripheral surface which is curved and faces an outer peripheral surface of the rotor (20) with a predetermined distance (air gap (G)) from the outer peripheral surface.

<Rotor (20)>

Figure 2:
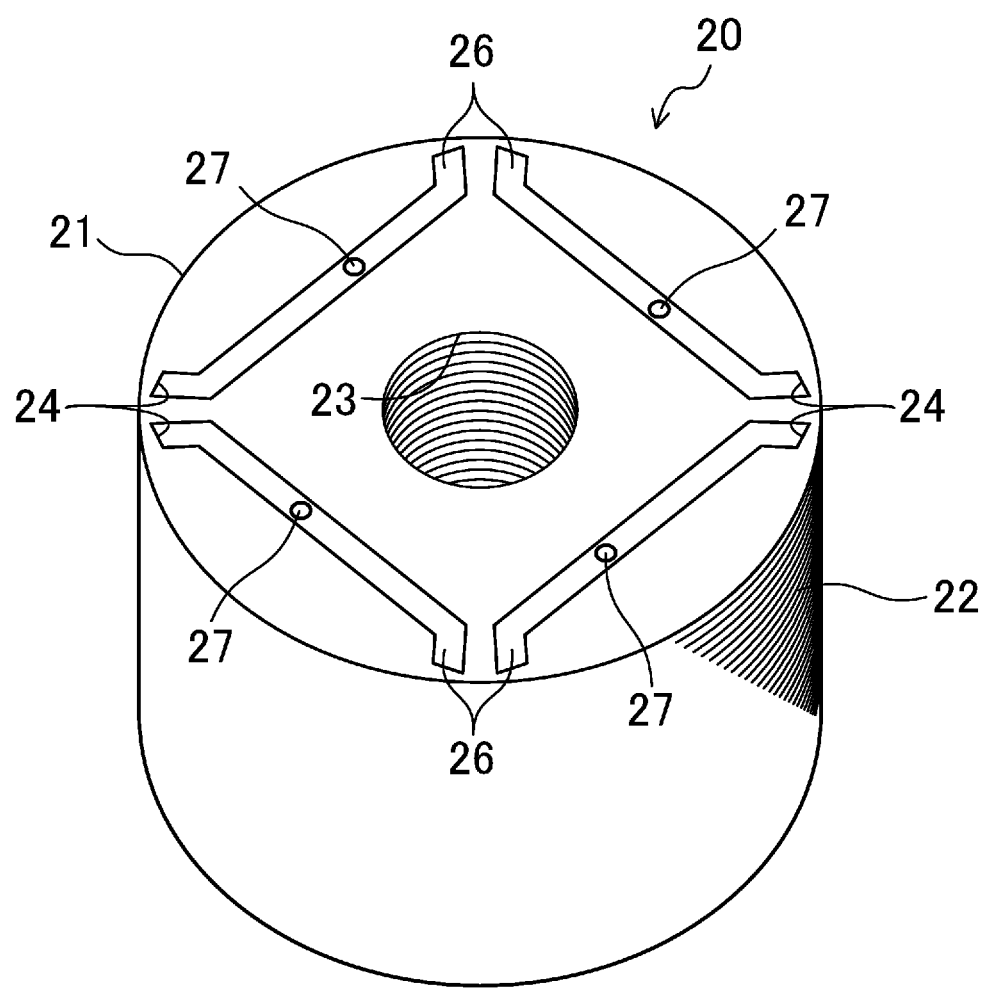
FIG. 2 is a perspective view of a rotor.
Figure 3:
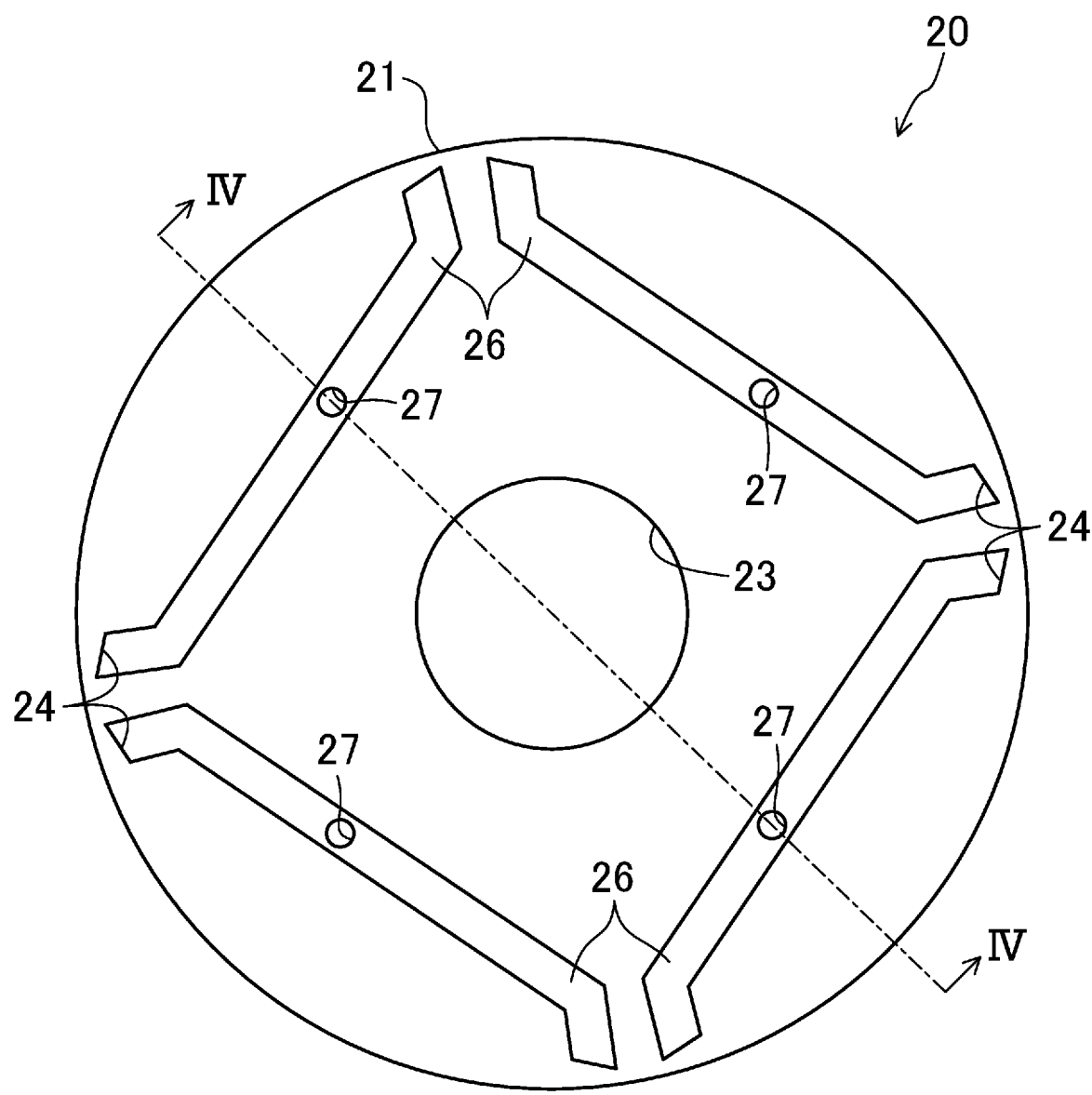
FIG. 3 is a plan view of the rotor as viewed in an axial direction.
Figure 4:
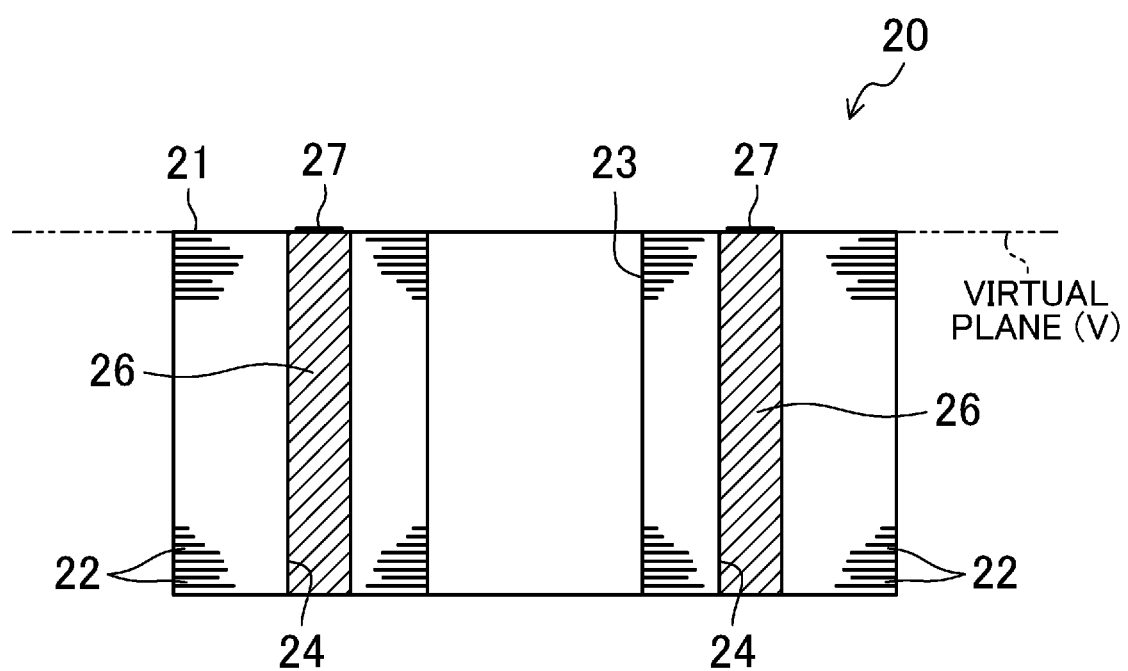
FIG. 4 is a vertical cross-sectional view of the rotor.

FIGS. 2 and 3 respectively illustrate the rotor (20) in a perspective view and a plan view as viewed in an axial direction. FIG. 4 illustrates the rotor (20) in a vertical cross-sectional view. FIG. 4 corresponds to a cross-sectional view taken along line IV-IV shown in FIG. 3.

The rotor (20) includes a rotor core (21) and four bonded magnets (26). That is, the rotor (20) has four magnetic poles. The magnetic poles of the rotor (20) are skewed to reduce cogging torque. FIGS. 1 to 4 do not illustrate end plates (e.g., disc-shaped plates made of a non-magnetic material such as stainless steel), which are generally disposed at both axial ends of the rotor.

—Rotor Core (21)—

Figure 5:
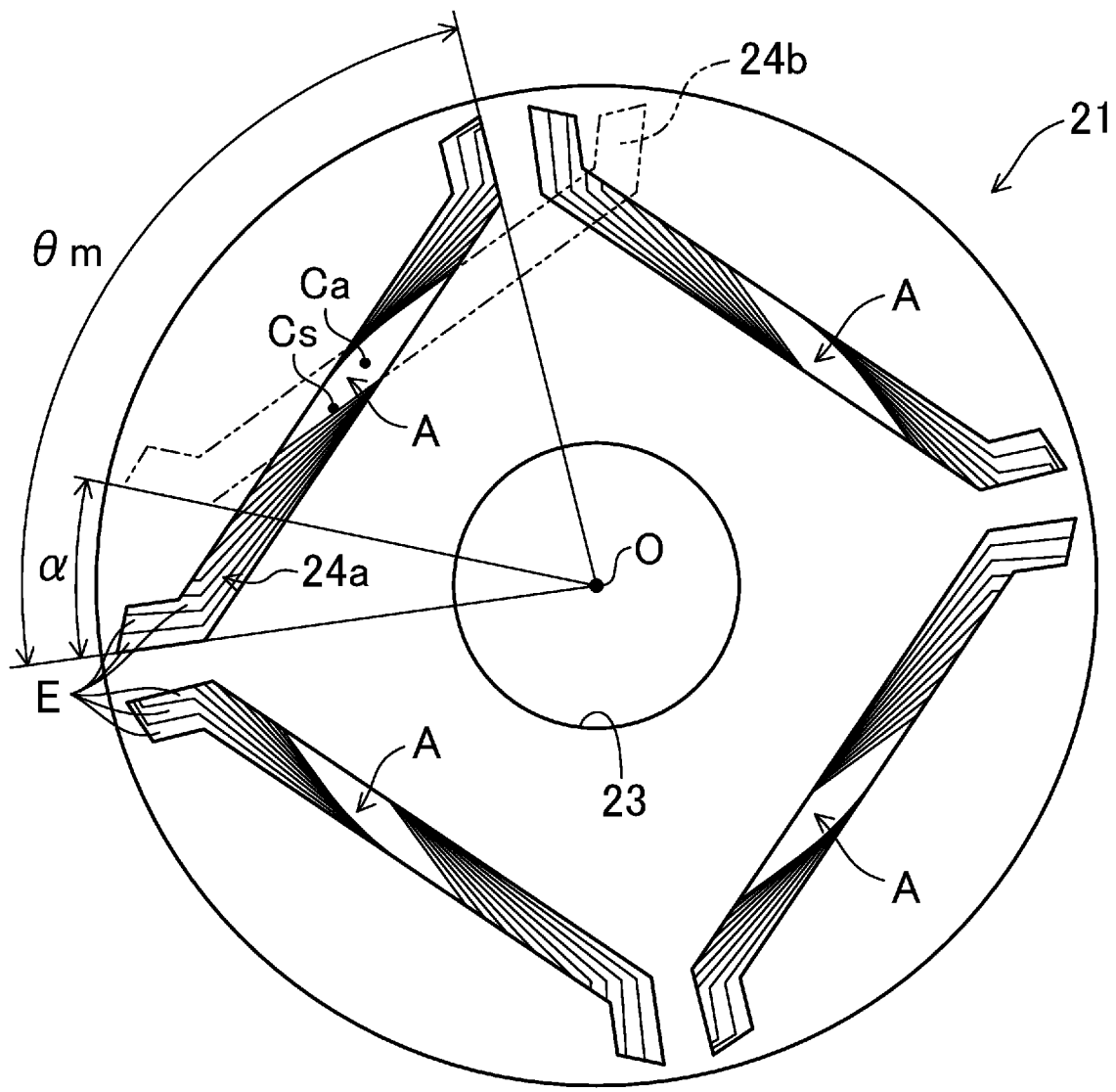
FIG. 5 is a plan view of a rotor core as viewed in an axial direction.
Figure 6:
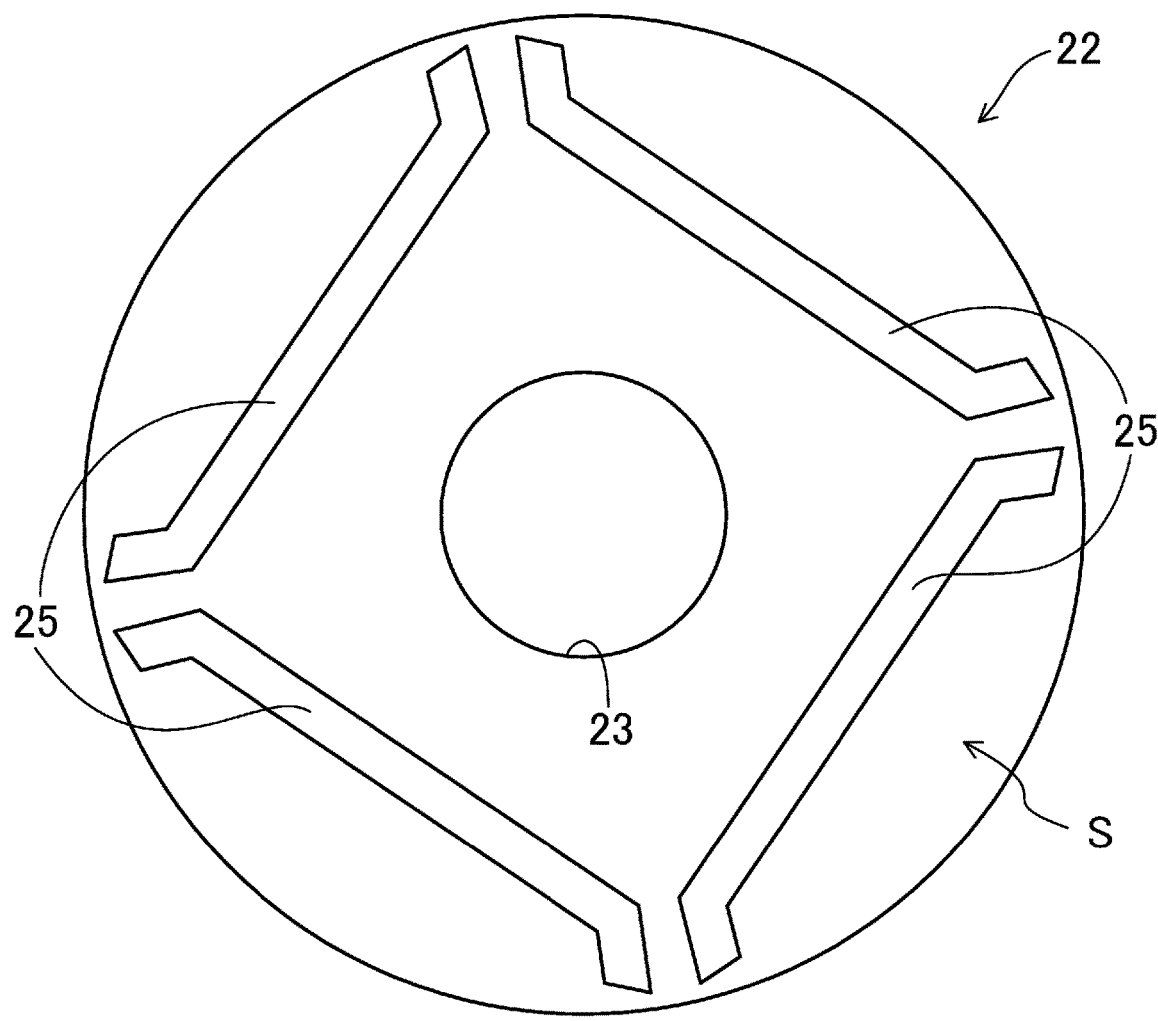
FIG. 6 is a plan view of a core member.

FIG. 5 is a plan view illustrating the rotor core (21) as viewed in the axial direction. The rotor core (21) is a so-called "laminated core" which is skewed as described later in detail. Specifically, the rotor core (21) is comprised of a plurality of core members (22) of the same shape formed by punching a magnetic steel sheet of, for example, 0.3 mm to 0.5 mm in thickness, using a pressing machine, and laminated one after the other in the axial direction. FIG. 6 illustrates the core member (22) of this embodiment in a top view. The core member (22) is provided with a through hole (25) for forming a magnet slot (24) described later. In this embodiment, multiple core members (22) are laminated and joined together by crimping to form the cylindrical rotor core (21). The magnetic steel sheet used as the material of the core members (22) is preferably provided with an insulation coating in view of reducing the possibility of generation of eddy current.

The rotor core (21) is provided with four magnet slots (24) for housing the bonded magnets (26) arranged around the axial center (O) of the rotor core (21) at a pitch of 90 degrees. Each of the magnet slots (24) penetrates the rotor core (21) in the axial direction. When viewed in transverse section, the magnet slot (24) has a rectangular body extending in a direction orthogonal to the radius of the rotor core (21), and rectangular end portions extending radially outward from both ends of the body.

Further, the rotor core (21) is provided with an axial hole (23) formed through the center thereof, in which the drive shaft (30) for driving a load (e.g., a rotary compressor of an air conditioner) is tightly fitted (e.g., shrink fitted). Thus, the axial center (O) of the rotor core (21) is coaxial with the axial center of the drive shaft (30).

—Skewed Structure—

In this embodiment, the rotor core (21) is "skewed" because of the core members (22) shifted in the circumferential direction in accordance with their position in the laminate (position in the axial direction). For example, if the rotor (20) has a skew angle α (mechanical angle, [degrees]) and N core members (22) are laminated (N is a natural number, N≥2), the m$^{th}$ core member (22) from the end (m is a natural number, N≥m≥2) of the rotor core (21) of this embodiment is rotated only by α/(N−1) [degrees] about the axial center (O) of the rotor core (21) with respect to the m−1$^{th}$ core member (22). In this configuration, as shown in FIG. 5, the lamination plane (S) of the core members (22) of the rotor core (21) is partially exposed. When the inside of the magnet slot (24) is viewed in the axial direction, the exposed portion (will be hereinafter referred to as an "exposed plane (E)") is visible from outside.

Further, in this rotor core (21), a region which ensures a view through the magnet slot (24) from one of the openings (will be hereinafter referred to as a "slot opening (24a)") of the magnet slot (24) to the other (will be hereinafter referred to as a "slot opening (24b)") in the direction of the axial center (O) is present on a virtual plane (V) orthogonal to the axial center (O) of the rotor core (21) and including the slot opening (24a). This region will be hereinafter referred to as a "region A." FIG. 5 shows the position of the region A, and FIG. 4 shows the position of the virtual plane (V) in the axial direction. The region A is present when the width of the magnet (θm) is larger than the skew angle (α). In the example of FIG. 5, the formula (θm)>(α) is met. As shown in FIG. 5, the width of the magnet (θm) is the maximum width of each of the bonded magnets (26) in the circumferential direction represented by an angle about the axial center (O) of the rotor core (21). In this configuration, the center (Ca) (center of figure) of the region A is misaligned with the center (Cs) (center of figure) of the slot opening (24a) projected on the virtual plane (V) (see FIG. 5).

The skew angle (α) of this embodiment is fixed to a theoretical skew angle (mechanical angle [degrees]) which can minimize the cogging torque. The theoretical skew angle (mechanical angle [degrees]) can be represented by 360°/L where L is the least common multiple of the number of magnetic poles of the stator (number of coil slots) and the number of magnetic poles of the rotor. In this embodiment, the stator (10) has six magnetic poles, and the rotor (20) has four magnetic poles. Thus, the least common multiple L=12, and the theoretical skew angle α=360°/12=30°. For example, if 100 core members (22) were laminated to form the rotor core (21), the angle of shift in the circumferential direction between adjacent core members (22) would be 0.3°.

—Bonded Magnet (26)—

The bonded magnet (26) is a permanent magnet formed by mixing a magnetic material such as fine powder or particles of a ferritic or rare-earth magnet with a binder such as a nylon resin or a PPS resin, and solidifying the obtained mixture. In this embodiment, as will be described later, a bonded magnet material (26a) obtained by mixing powder or particles of a non-magnetized magnetic material with a binder is fed into the magnet slots (24) of the rotor core (21), and magnetized to form the bonded magnets (26).

The bonded magnet (26) has end faces which are respectively exposed at the slot openings (24a, 24b), and one of the end faces is provided with a gate mark (27). The gate mark (27) is a trace in the shape of a gate (usually round) left after the material supply on a portion of the end face corresponding to the position of a gate (48) provided for a molding die (40) which will be described later. The gate mark (27) left on the end face of the bonded magnet (26) may be removed in a later process.

<Method for Manufacturing Rotor (20)>

—Molding Die Used for Manufacture—

Figure 7:
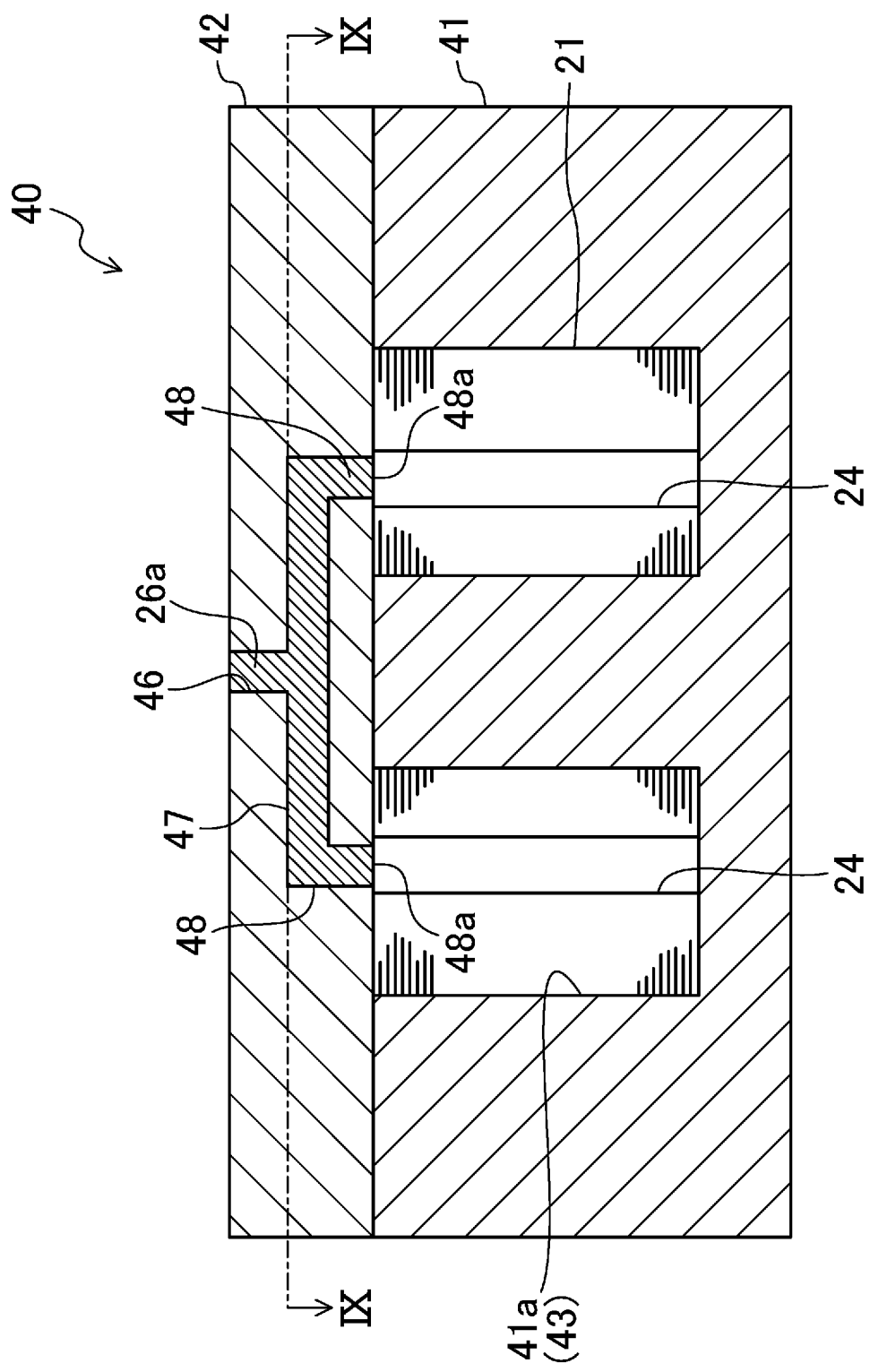
FIG. 7 is a vertical cross-sectional view of an injection molding die used for the manufacture of a rotor.

FIG. 7 is a vertical cross-sectional view of an injection molding die (40) used for the manufacture of the rotor (20).

As illustrated in FIG. 7, the molding die (40) is comprised of a stationary die (41) and a movable die (42). FIG. 7 illustrates the rotor core (21) placed in the die.

As illustrated in FIG. 7, the stationary die (41) has a recess (41a) in which the rotor core (21) can be fitted. The movable die (42) is a plate-shaped die provided to face the opening of the recess (41a). The stationary die (41) and the movable die (42) are locked so that the movable die (42) closes the recess (41a) in the stationary die (41), thereby forming a cavity (43) between the dies.

Figure 8:
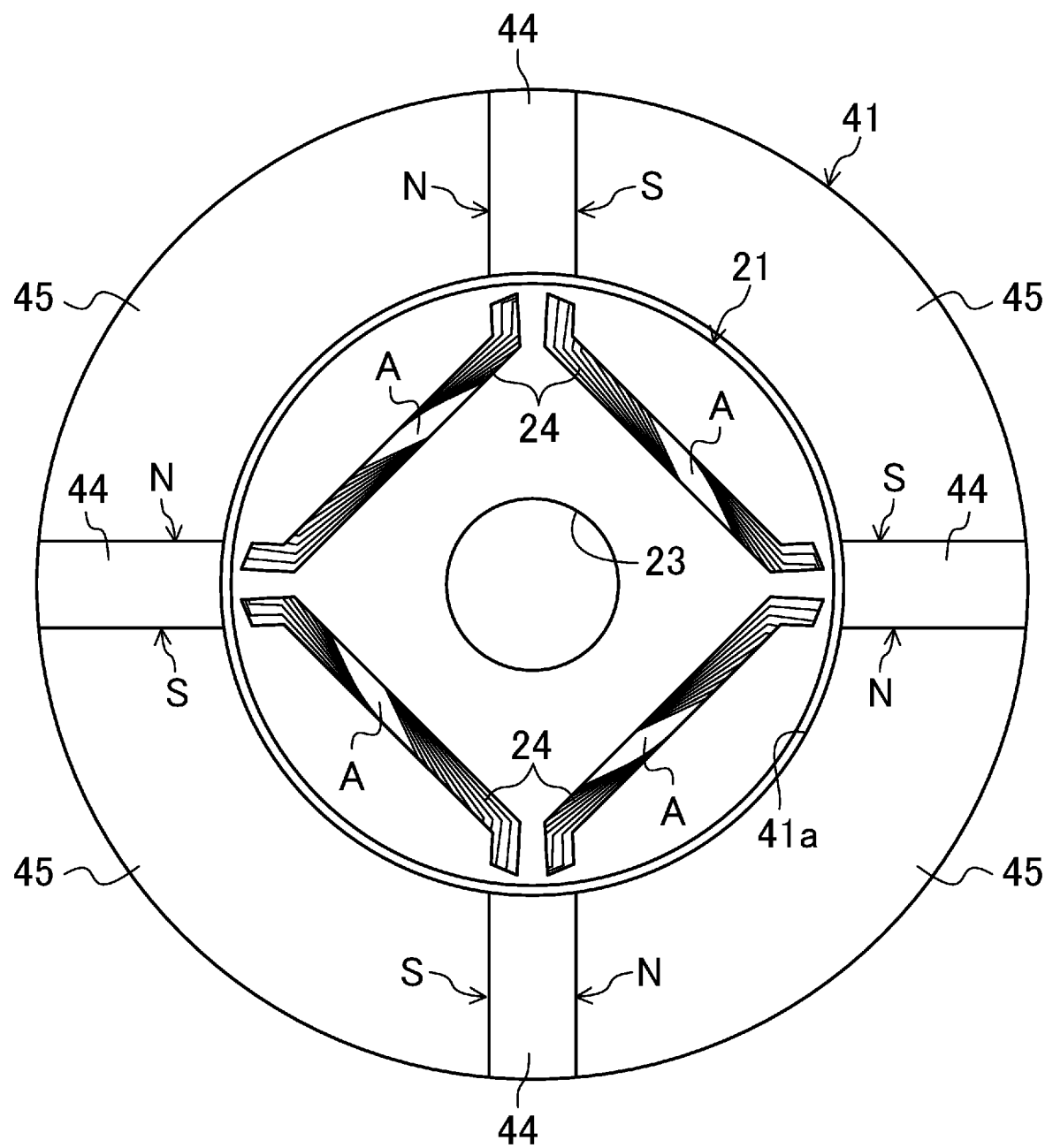
FIG. 8 is a plan view of a stationary die.

FIG. 8 is a plan view of the stationary die (41). FIG. 8 also illustrates the rotor core (21) placed in the die. As illustrated in FIG. 8, the stationary die (41) is provided with permanent magnets (44) and pole pieces (45) alternately arranged in the circumferential direction around the recess (41a). The number of pole pieces (45) is equal to the number of magnetic poles so that the pole pieces (45) are arranged in a one-to-one relationship with the bonded magnets (26) of the rotor (20). Thus, in this embodiment, four pole pieces (45) and four permanent magnets (44) are provided. In this configuration, a magnetic field can be generated in the cavity (43) of the molding die (40). Specifically, each of the pole pieces (45) in the molding die (40) applies a magnetic flux from the permanent magnet (44) in contact with the pole piece (45) to the rotor core (21) set in the cavity (43).

The movable die (42) is provided with a spool (46), runners (47) branched from the spool (46), and gates (48) each of which is formed continuously from an associated one of the runners and opens toward the cavity (43).

Figure 9:
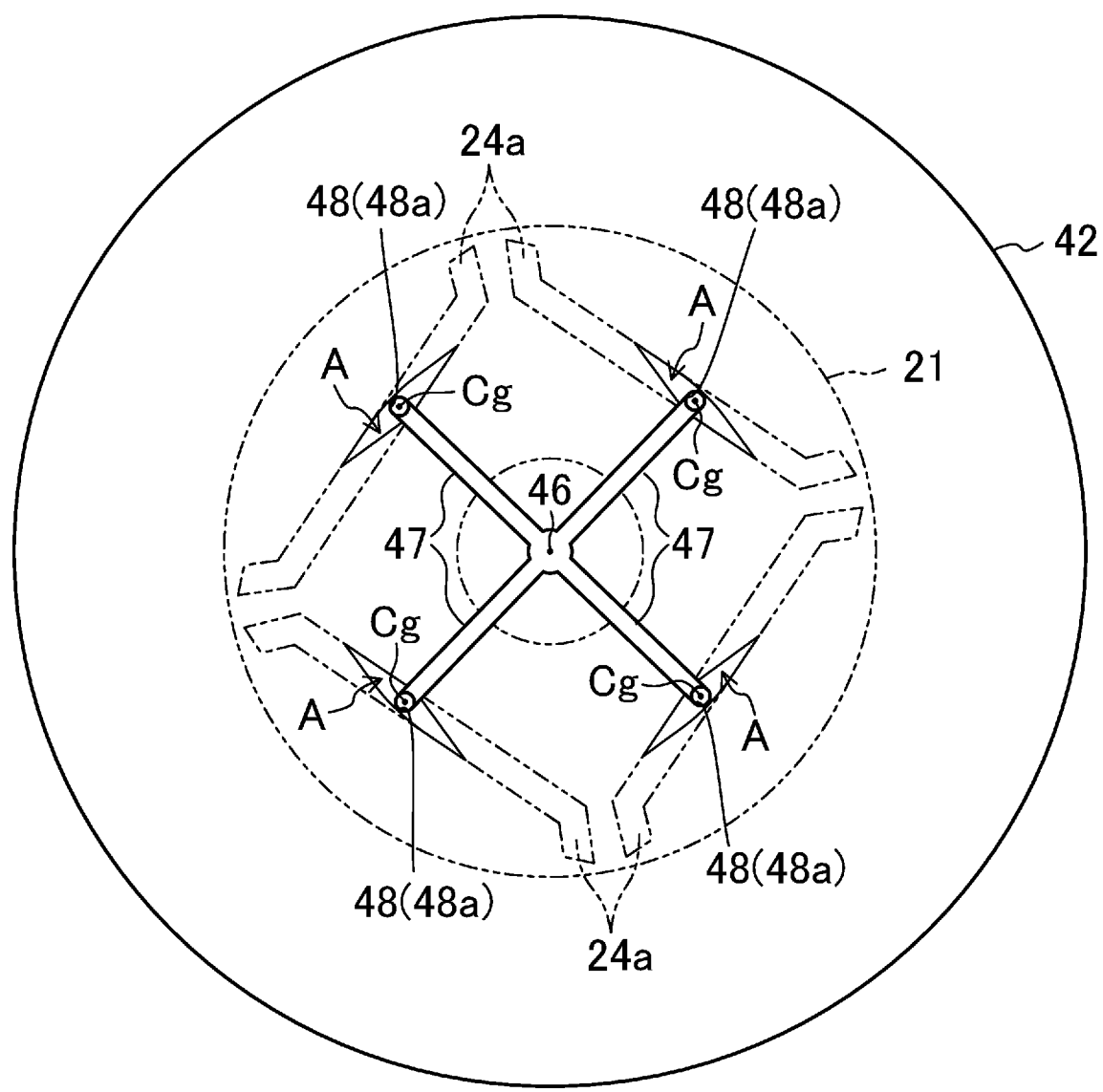
FIG. 9 is a horizontal cross-sectional view of a movable die.

FIG. 9 is a horizontal cross-sectional view of the movable die (42). FIG. 9 corresponds to a cross-sectional view taken along line IX-IX of FIG. 7, and illustrates the position of the rotor core (21) set in the recess (41a) in a dash-dot-dot line. As shown in FIG. 9, the gates (48) of the movable die (42) respectively have openings (will be hereinafter referred to as "gate openings (48a)") which correspond to the regions A defined with respect to the openings (slot openings (24a)) of the magnet slots (24) facing the movable die (42).

In this embodiment, the position and size of each of the gate openings (48a) are determined such that the entire shape of the gate opening (48a) projected on the virtual plane (V) does not deviate from an associated one of the regions A. In this example, the gate opening (48a) projected on the virtual plane (V) has the shape of a circle, and the radius of the circle is determined such that the center of the circle (Cg) is aligned with the center of the region A (Ca) (center of figure), and that the entire circle does not deviate from the region A. As such, in this embodiment, the exposed surface (E) of the core member (22) does not exist directly below the gate opening (48a).

—Injection Molding—

To form the bonded magnet (26), first, the molding die (40) is set in an injection molding machine, and the rotor core (21) is placed in the recess (41a) of the stationary die (41). The rotor core (21) is positioned in the direction of rotation so that the region A and the gate opening (48a) are associated with each other (see FIG. 9).

Then, the stationary die (41) and the movable die (42) are locked. As a result, the rotor core (21) is arranged in the cavity (43) of the molding die (40).

Subsequently, the bonded magnet material (26a) is injected from the injection molding machine into the molding die (40) so that the bonded magnet material (26a) is poured into each of the magnet slots (24) of the rotor core (21) set in the cavity (43) through the slot opening (24a). This will be referred to as an "injection process." The bonded magnet material (26a) in the magnet slots (24) is magnetically oriented by the magnetic field of the permanent magnets (44).

The bonded magnet material (26a) used in this embodiment is a mixture of powder or particles of a non-magnetized magnetic material and a binder. The bonded magnet material (26a), which has been heated, kneaded, and fluidized in the injection molding machine, flows into the cavity (43) from the gates (48) through the spool (46) and runners (47) of the movable die (42), and then goes into the magnet slots (24). In FIG. 7, the bonded magnet material (26a) flowing through the spool (46), the runners (47) and the gates (48) is hatched.

Figure 10:
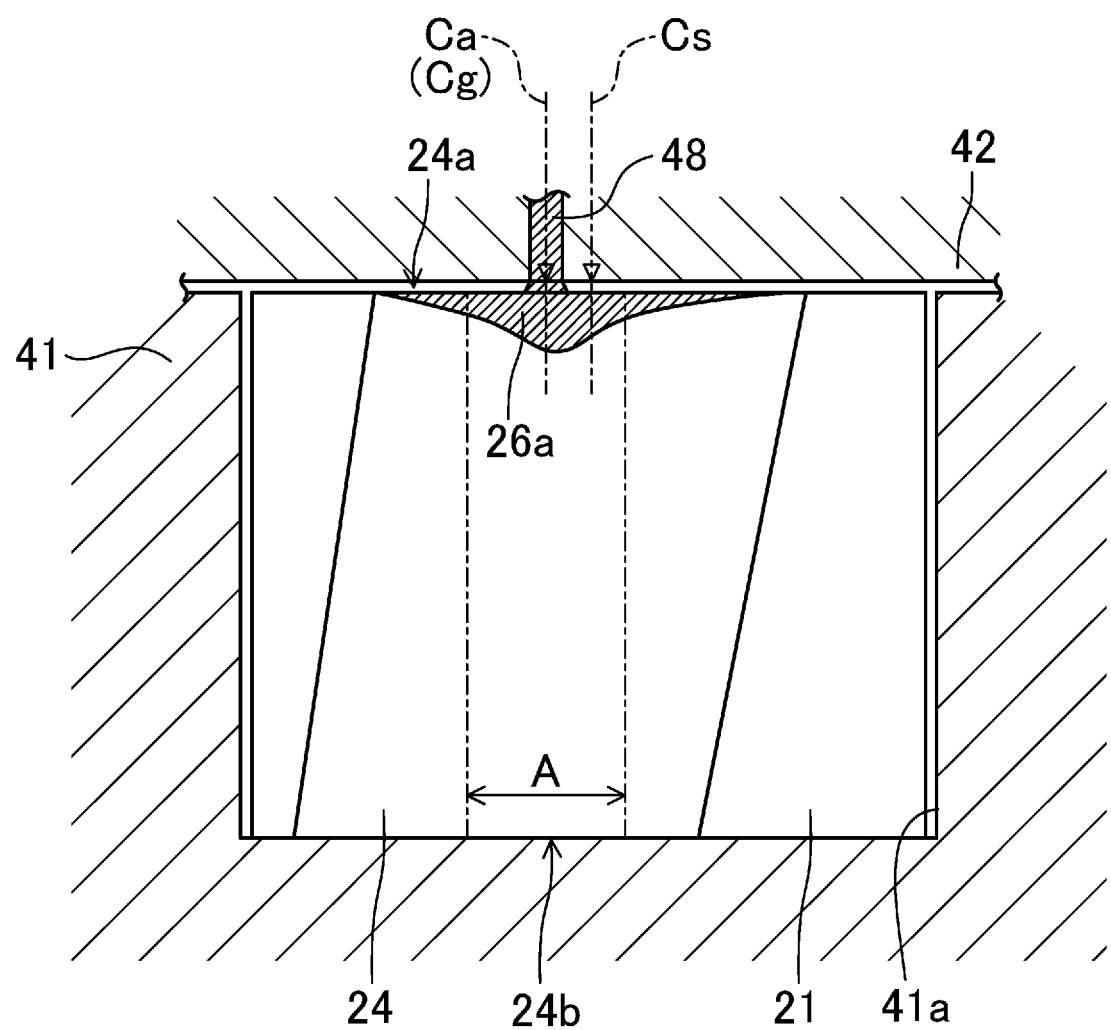
FIG. 10 schematically illustrates the state of a bonded magnet material in a magnet slot in an initial stage of an injection process.

FIG. 10 schematically illustrates the state of the bonded magnet material (26a) in the magnet slots (24) in an initial stage of the injection process. In the injection process, flow pressure of the bonded magnet material (26a) in the cavity (43) (pressure applied by the bonded magnet material (26a) flowing in the cavity (43)) is maximized immediately below the gate openings (48a). Thus, as shown in FIG. 10, the bonded magnet material (26a) falls downward in the magnet slot (24), in particular, immediately below the gate opening (48a), while spreading in the direction orthogonal to the direction of injection (in a horizontal direction in this example) due to magnetic flux produced by the pole pieces (45). In this way, the bonded magnet material (26a) is magnetically oriented and magnetized.

The bonded magnet material (26a) spread in the horizontal direction is pushed into the depth of the magnet slot (24) (downward in FIG. 10) by the bonded magnet material (26a) being continuously injected from the gate (48), and soon hits the exposed surface (E). The bonded magnet material (26a) which is going to hit the exposed surface (E) has significantly lower flow pressure than the bonded magnet material (26a) just injected from the gate (48).

The amount of the bonded magnet material (26a) injected from the injection molding machine is determined such that the bonded magnet material (26a) fills each of the magnet slots (24). When the determined amount of the material has been injected, the bonded magnet (26) is formed in each of the magnet slots (24). The bonded magnet (26) has a gate mark (27) left on a portion of its end face facing the gate (48) to correspond to the position of the gate (48). The other end face of the bonded magnet (26) is a flat surface on which the shape of the bottom surface of the recess (41a) of the stationary die (41) has been transferred.

In the rotor (20) thus obtained, the drive shaft (30) is fixed, for example, by shrink fitting (kind of interference fit). The drive shaft (30) may be shrink-fitted to the rotor core (21) before forming the bonded magnet (26) by injection molding.

Advantages of Embodiment

In the present embodiment described above, no exposed surface (E) of the core member (22) exists immediately below the gate (48). Thus, the bonded magnet material (26a) just injected from the gate (i.e., the bonded magnet material (26a) having the maximum flow pressure) hardly hits the exposed surface (E). Specifically, in this embodiment, the bonded magnet material (26a) that has reached the exposed surface (E) has the flow pressure significantly lower than that of the material just injected from the gate. This can reduce stress exerted on the core members (22) during the formation of the bonded magnet (26). Thus, this embodiment can reduce the risk of exfoliation of the core members (22) during the injection process.

Second Embodiment

Figure 11:
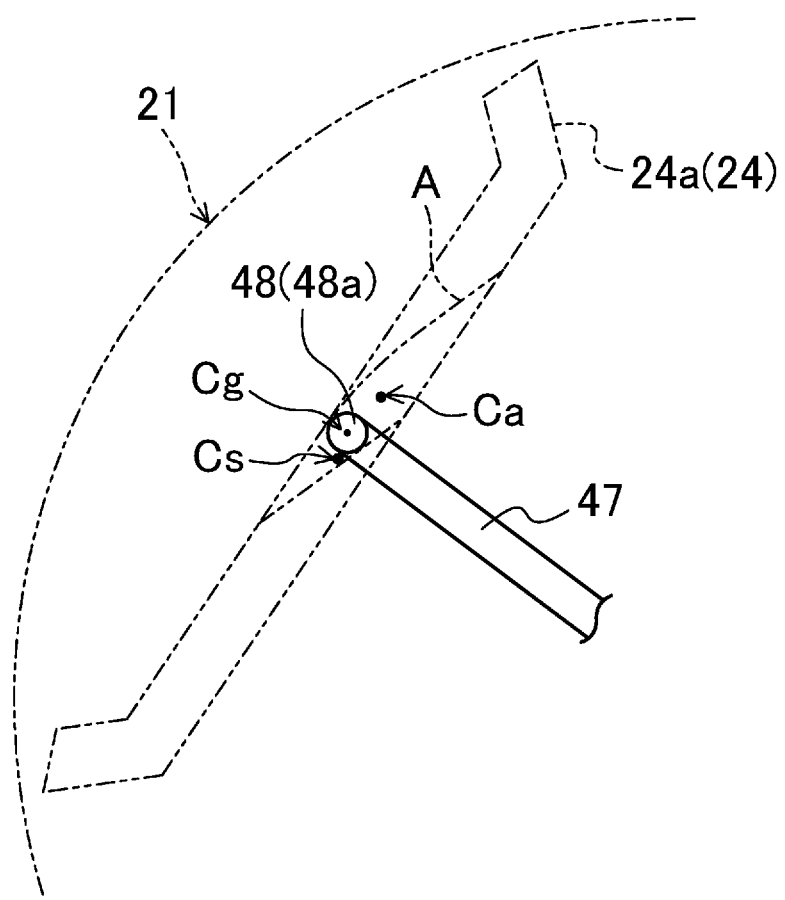
FIG. 11 illustrates a gate opening of a movable die according to a second embodiment and its vicinity in an enlarged scale.

FIG. 11 illustrates a gate opening (48a) of a movable die (42) according to a second embodiment and its vicinity in an enlarged scale. Also in this embodiment, the movable die (42) has gate openings (48a) respectively corresponding to regions A defined with respect to openings (slot openings (24a)) of the magnet slots (24) facing the movable die (42). Each of the gate openings (48a) projected on a virtual plane (V) has the shape of a circle. The center (Cg) of the circle is misaligned with the center (Ca) of the region A. More specifically, as shown in FIG. 11, the center (Cg) of the circle is misaligned in a direction toward the center (Cs) of the slot opening (24a) (center of figure), and the radius of the circle is determined such that the entire circle does not deviate from the region A.

If the center (Cg) of the gate opening (48a) is set closer to the center (Cs) of the slot opening (24a) in this way, the flow pressure of the bonded magnet material (26a) exerted on the exposed surface (E) becomes lower than that exerted in the case where the position of injection of the bonded magnet material has not been contrived, although it may become somewhat higher than that exerted in the first embodiment.

In addition, setting the center (Cg) of the gate opening (48a) closer to the center (Cs) of the slot opening (24a) allows the bonded magnet material (26a) injected from the gate (48) to spread uniformly in the direction orthogonal to the direction of injection (horizontal direction). If the bonded magnet material (26a) easily spreads uniformly in the horizontal direction in the magnet slot (24), improvement in the ratio of magnetic orientation can be expected. That is, in this embodiment, the stress exerted on the core members (22) during the injection process can be reduced, and improvement in the ratio of magnetic orientation can be expected.

Third Embodiment

In a third embodiment of the present invention, the magnet slots (24) of different shapes will be described.

Figure 12:
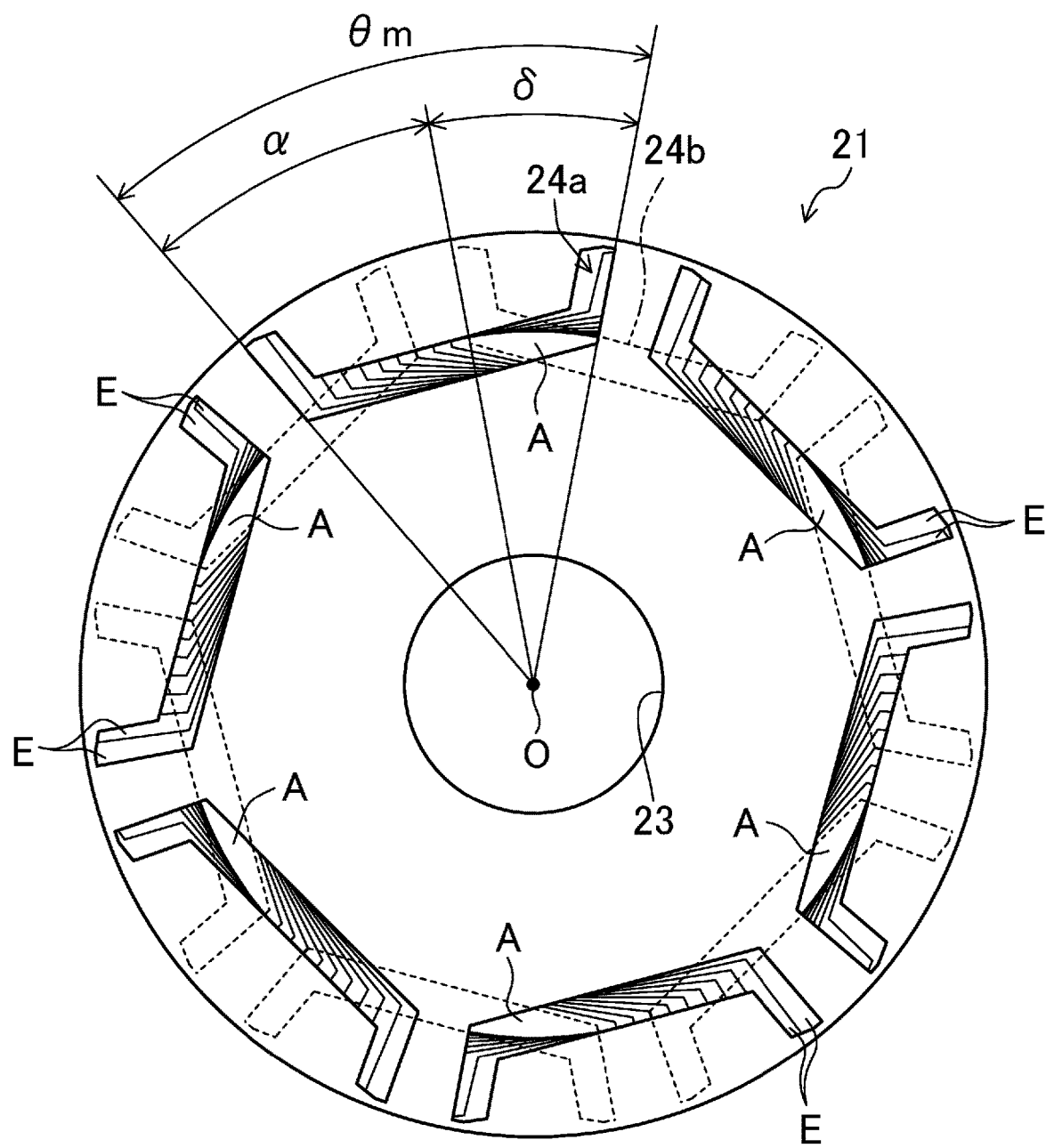
FIG. 12 illustrates an example of a rotor core having six magnetic poles.

<1> FIG. 12 shows an example of a rotor core (21) having six magnetic poles. As shown in FIG. 12, suppose that the width of the region A in the circumferential direction is δ represented by an angle [degrees] around the axial center (O) of the rotor core (21), the width of the magnet (θm), the skew angle (α), and the width of the region A (δ) establish the formula of: θm−α=δ.

Figure 13:
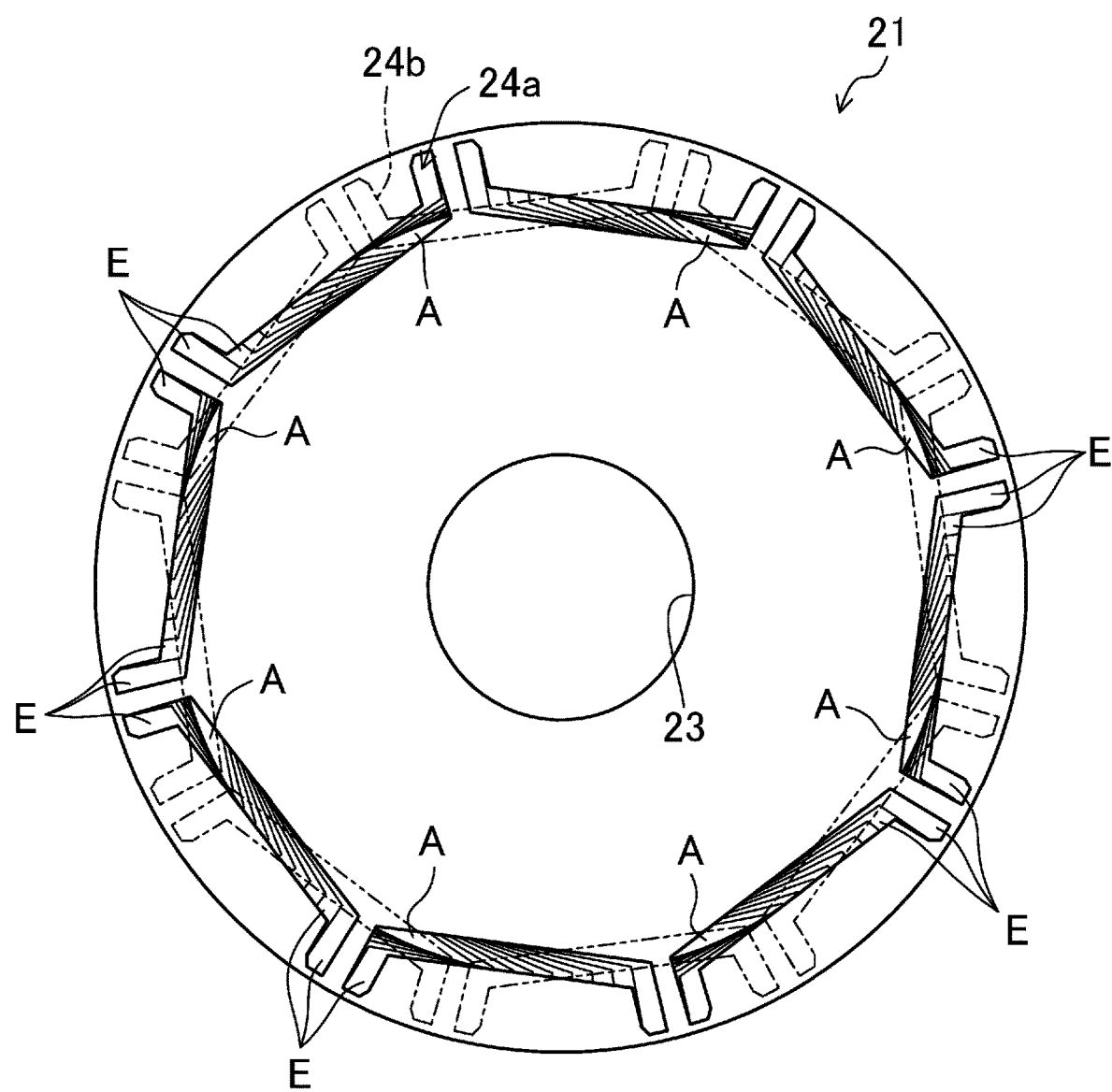
FIG. 13 illustrates an example of a rotor core having eight magnetic poles.

FIG. 13 shows an example of a rotor core (21) having eight magnetic poles. Even if the rotor (20) has six or eight magnetic poles, the flow pressure of the bonded magnet material (26a) exerted on the exposed surface (E) can be reduced when the gates (48) of the molding die (40) are positioned as described in the first and second embodiments.

Figure 14:
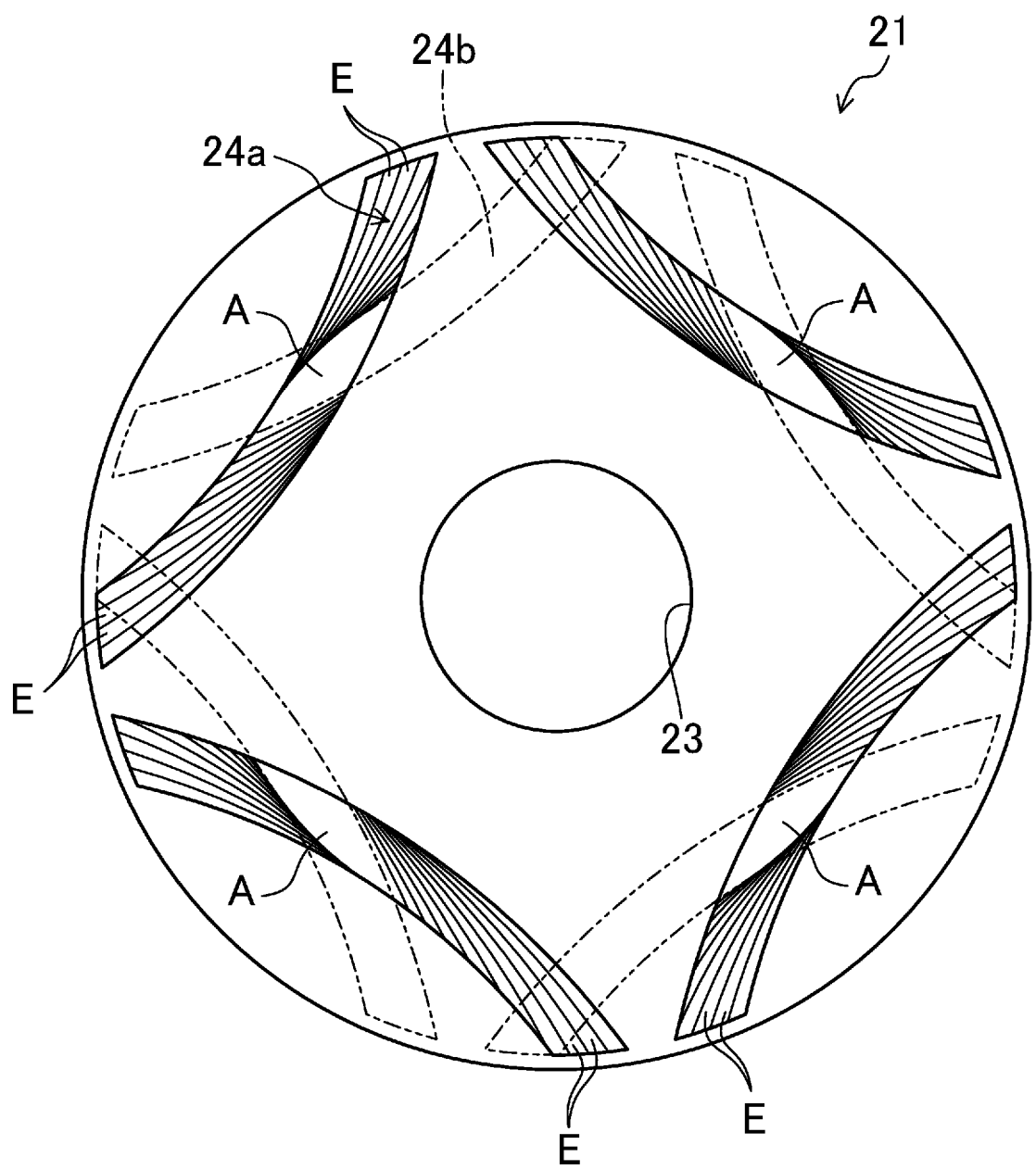
FIG. 14 illustrates an example of a rotor core provided with bonded magnets each having an arc-shaped cross section.

<2> FIG. 14 shows an example of a rotor core (21) provided with bonded magnets (26) each having an arc-shaped cross section. More specifically, when viewed in section, each of the arc-shaped bonded magnets (26) has a convex inner circumferential portion. Also in this example, the rotor core (21) is skewed. Thus, in this rotor core (21), a region which ensures a view through the magnet slot (24) from the slot opening (24a) to the slot opening (24b) of the magnet slot (24) in the direction of the axial center (O) is present on a virtual plane (V) orthogonal to the axial center (O) of the rotor core (21) and including the slot opening (24a). This region will also be hereinafter referred to as a "region A."

Specifically, even if the bonded magnet (26) has an arc-shaped cross section, the stress exerted on the core members (22) during the injection of the bonded magnet material into the skewed laminated core can be reduced when the gates (48) of the molding die (40) are positioned as described in the first and second embodiments.

Figure 15:
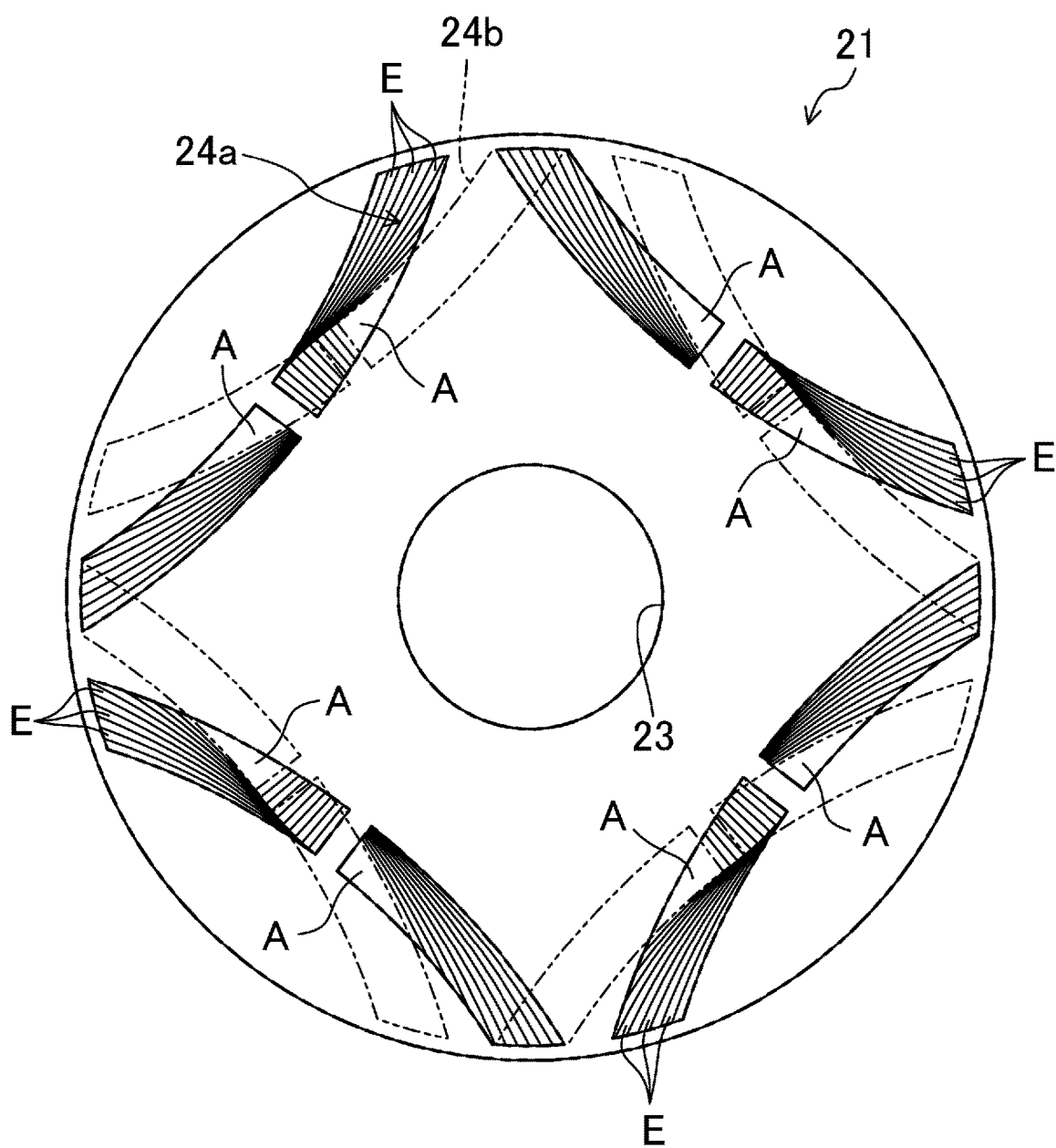
FIG. 15 illustrates an example of a rotor core provided with bonded magnets each of which is divided into pieces in each magnetic pole.

<3> FIG. 15 shows an example of a rotor core (21) provided with the bonded magnets (26), each of which is divided into pieces in each magnetic pole. In the example shown in FIG. 15, each magnetic pole is comprised of two bonded magnets (26), each of which is arc-shaped, and has a convex inner circumferential portion, when viewed in section. Thus, in the rotor core (21), two magnet slots (24) are provided for a single magnetic pole. In this example, a region A is present near a boundary (center bridge) between the two magnet slots (24) forming the same magnetic pole. Also in this case, the stress exerted on the core members (22) during the injection of the bonded magnet material into the skewed laminated core can be reduced when the gates (48) of the molding die (40) are positioned as described in the first and second embodiments, in view of the region A associated with each magnet slot (24).

Figure 16:
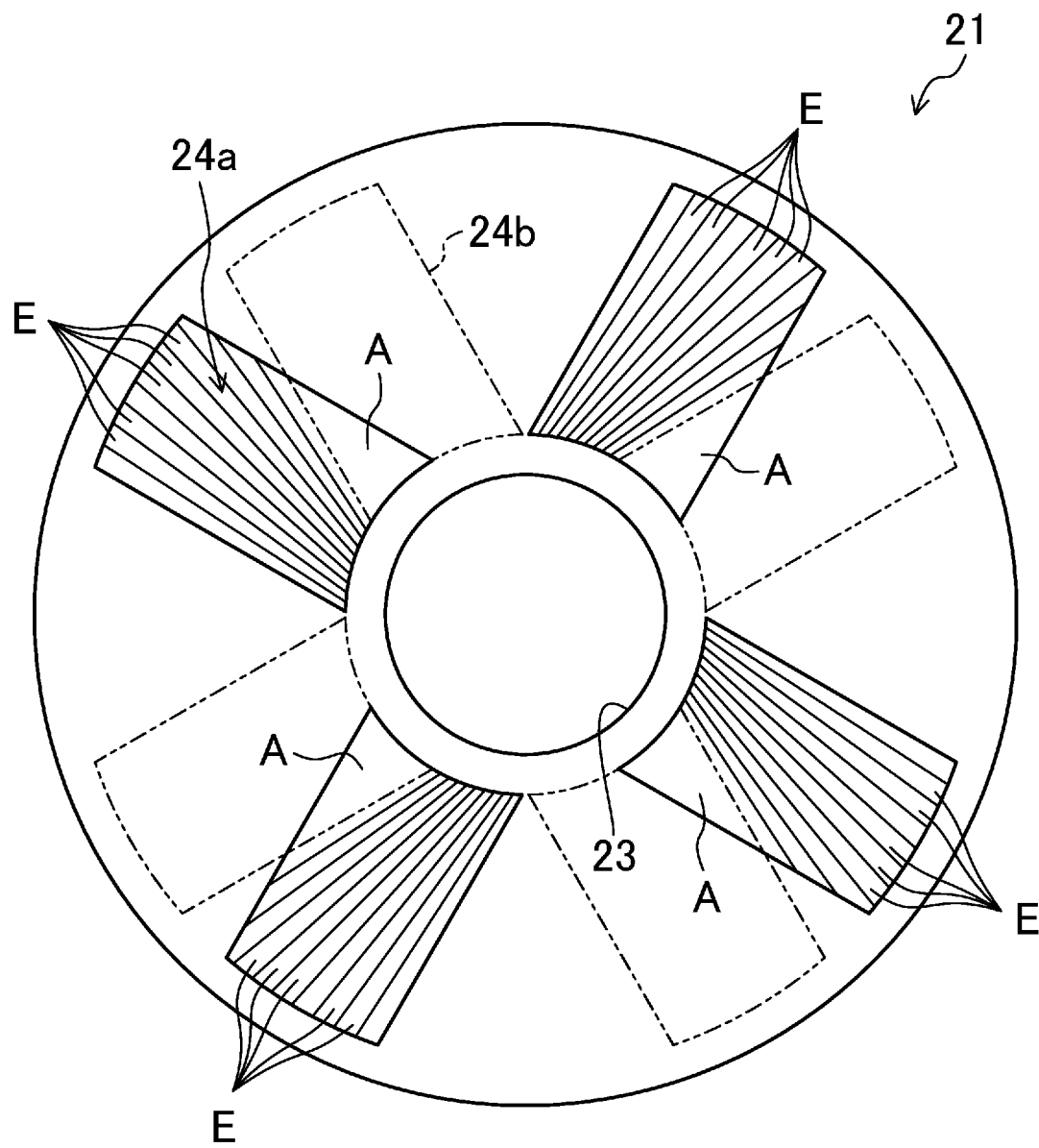
FIG. 16 illustrates an example of a rotor core provided with bonded magnets each having substantially an I-shaped cross section.

<4> FIG. 16 shows an example of a rotor core (21) provided with the bonded magnets (26) each having substantially an I-shaped cross section. More specifically, when viewed in section, each of the bonded magnets (26) is in the shape of a rectangle having longitudinal sides extending in the radial direction of the rotor core (21). Also in this example, the rotor core (21) is skewed. Thus, in this rotor core (21), a region which ensures a view through the magnet slot (24) from the slot opening (24a) to the slot opening (24b) in the direction of the axial center (O) is present on a virtual plane (V) orthogonal to the axial center (O) of the rotor core (21) and including the slot opening (24a). This region will also be hereinafter referred to as a "region A." Specifically, even if the bonded magnet (26) has an I-shaped cross section, the stress exerted on the core members (22) during the injection of the bonded magnet material into the skewed laminated core can be reduced when the gates (48) of the molding die (40) are positioned as described in the first and second embodiments.

Other Embodiments

It is ideal that the shape of the gate opening (48a) projected on the virtual plane (V) never deviates from the region A. Alternatively, some deviation from the region A is allowable. Specifically, if the shape of the gate opening (48a) projected on the virtual plane partially overlaps with the region A, an area of the exposed surface (E) facing the gate (48) can be reduced. This can reduce the possibility that the bonded magnet material (26a) just injected into the molding die (40) hits the exposed surface (E). That is, even if the projected shape somewhat deviates from the region A, the stress exerted on the core members (22) during the formation of the bonded magnets (26) can be reduced.

Note that how the core members (22) are shifted from each other (stacked) for providing the skewed core is merely an example. For example, the core members (22) are not necessarily shifted at regular angles in the circumferential direction. Further, every predetermined number of the core members may be shifted in the circumferential direction. For example, a plurality of groups, each of which includes X core members (22) (X is a natural number) stacked in the same phase in the circumferential direction, may be stacked with their phases shifted in the circumferential direction.

The methods for manufacturing a rotor described in the embodiments are also applicable to, not only the manufacture of the rotor of the motor, but also the manufacture of a rotor of a power generator.

INDUSTRIAL APPLICABILITY

The present invention is useful for a method for manufacturing a rotor of an electric rotating machine, and a rotor.

DESCRIPTION OF REFERENCE CHARACTERS

1 Motor (Electric Rotating Machine)
21 Rotor Core
22 Core Member
24 Magnet Slot
24a Slot Opening (Opening)
24b Slot Opening (Opening)
25 Through Hole
26 Bonded Magnet
26a Bonded Magnet Material
27 Gate Mark
40 Molding Die
43 Cavity
48 Gate

The invention claimed is:

1. A method for manufacturing a rotor including a skewed rotor core made of a cylindrical laminate of a plurality of disc-shaped core members each having through holes respectively corresponding to magnet slots for housing bonded magnets, the core members being shifted in a circumferential direction in accordance with their position in the laminate, the method comprising:
   an injection process of injecting a bonded magnet material into a cavity of a molding die generating a magnetic field in the cavity so that the bonded magnet material is poured into each of the magnet slots in the rotor core set in the cavity through one of openings of each magnet slot, wherein
   the molding die used in the injection process has gates which respectively open at positions corresponding to regions formed by the plurality of circumferentially shifted core members, each of which corresponds to an area along the axial direction of rotor core unobstructed by any of the plurality of circumferentially shifted core members.

2. The method of claim 1, wherein each of the gates of the molding die used in the injection process opens in alignment with a center of an associated one of the regions.

3. The method of claim 2, wherein the bonded magnet material contains polyphenylene sulfide as a binder for a magnetic material.

4. The method of claim 1, wherein each of the gates of the molding die used in the injection process opens at a position misaligned with a center of an associated one of the regions in a direction toward a center of the opening of the magnet slot through which the bonded magnet material is injected.

5. The method of claim 4, wherein the bonded magnet material contains polyphenylene sulfide as a binder for a magnetic material.

6. The method of claim 1, wherein the bonded magnet material contains polyphenylene sulfide as a binder for a magnetic material.

7. A rotor including bonded magnets, the rotor comprising:

a skewed rotor core made of a cylindrical laminate of a plurality of disc-shaped core members each having through holes respectively corresponding to magnet slots for housing the bonded magnets, the core members being shifted in a circumferential direction in accordance with their position in the laminate, wherein each of the bonded magnets has a gate mark which is left on a portion of an end face of the bonded magnet, the portion corresponding to a region which ensures a view from one of openings of the magnet slot formed at the end face to the other opening along an axial center of the rotor core.

* * * * *